(12) United States Patent
Bernhard et al.

(10) Patent No.: US 9,710,241 B2
(45) Date of Patent: Jul. 18, 2017

(54) APPARATUS AND METHOD FOR PROVIDING INSTRUCTION FOR HETEROGENEOUS PROCESSOR

(75) Inventors: Egger Bernhard, Seoul (KR); Soo-jung Ryu, Cheonan-si (KR); Dong-hoon Yoo, Seoul (KR); Il-hyun Park, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1280 days.

(21) Appl. No.: 12/564,093

(22) Filed: Sep. 22, 2009

(65) Prior Publication Data

US 2010/0211760 A1 Aug. 19, 2010

(30) Foreign Application Priority Data

Feb. 18, 2009 (KR) ........................ 10-2009-0013529

(51) Int. Cl.
 G06F 9/45 (2006.01)
 G06F 9/30 (2006.01)
 G06F 9/38 (2006.01)

(52) U.S. Cl.
 CPC .............. *G06F 8/41* (2013.01); *G06F 9/3012* (2013.01); *G06F 9/3891* (2013.01)

(58) Field of Classification Search
 None
 See application file for complete search history.

(56) References Cited

U.S. PATENT DOCUMENTS

| | | | | |
|---|---|---|---|---|
| 5,355,494 A | * | 10/1994 | Sistare et al. | 717/154 |
| 5,588,152 A | * | 12/1996 | Dapp et al. | 712/16 |
| 6,018,759 A | * | 1/2000 | Doing et al. | 718/108 |
| 6,233,540 B1 | * | 5/2001 | Schaumont | G06F 17/5022 703/14 |
| 6,606,588 B1 | * | 8/2003 | Schaumont | G06F 17/5045 703/15 |
| 6,964,029 B2 | * | 11/2005 | Poznanovic et al. | 716/105 |
| 7,134,120 B2 | * | 11/2006 | Hammes | 717/155 |
| 7,278,137 B1 | * | 10/2007 | Fuhler | G06F 8/4434 717/151 |
| 7,313,671 B2 | | 12/2007 | Leijten | |

(Continued)

FOREIGN PATENT DOCUMENTS

| | | |
|---|---|---|
| JP | 2006-505055 A | 2/2006 |
| KR | 2003-0067892 A | 8/2003 |

(Continued)

OTHER PUBLICATIONS

"Data Flow Graphs Intro" by Gang Quan; Published by Maseeh College of Engineering and Computer Science at PSU; 31 Pages; Access Date: Jan. 12, 2015.*

(Continued)

*Primary Examiner* — Steven Snyder
*Assistant Examiner* — Christopher Bartels
(74) *Attorney, Agent, or Firm* — NSIP Law (57) ABSTRACT

Provided are an apparatus and method for providing instructions for a heterogeneous processor having heterogeneous components supporting different data widths. Respective data widths of operands and connections in a data flow graph are determined by using type information of operands. Instructions, to be executed by the heterogeneous processor, are provided based on the determined data widths.

18 Claims, 6 Drawing Sheets

(56) References Cited

U.S. PATENT DOCUMENTS

| | | | |
|---|---|---|---|
| 7,398,347 B1 | 7/2008 | Pechanek et al. | |
| 7,543,284 B2* | 6/2009 | Bolton et al. | 717/157 |
| 7,996,827 B2* | 8/2011 | Vorbach et al. | 717/149 |
| 8,166,450 B2* | 4/2012 | Fuhler | G06F 8/4434 |
| | | | 717/101 |
| 8,627,335 B2* | 1/2014 | Kosche | 719/313 |
| 8,686,475 B2* | 4/2014 | Vorbach | 257/203 |
| 2001/0039610 A1* | 11/2001 | Busa et al. | 712/225 |
| 2002/0194236 A1* | 12/2002 | Morris | G06F 9/30036 |
| | | | 708/403 |
| 2003/0041163 A1* | 2/2003 | Rhoades et al. | 709/232 |
| 2003/0142818 A1* | 7/2003 | Raghunathan et al. | 380/1 |
| 2003/0154358 A1* | 8/2003 | Seong | G06F 9/30167 |
| | | | 712/24 |
| 2003/0229482 A1* | 12/2003 | Cook | G06F 17/5045 |
| | | | 703/14 |
| 2004/0006584 A1* | 1/2004 | Vandeweerd | G06F 9/5066 |
| | | | 718/107 |
| 2004/0215940 A1 | 10/2004 | Heishi et al. | |
| 2005/0049843 A1* | 3/2005 | Hewitt | G06F 17/5045 |
| | | | 703/14 |
| 2006/0005173 A1* | 1/2006 | Eng | 717/140 |
| 2006/0026578 A1* | 2/2006 | Ramchandran et al. | 717/149 |
| 2006/0259744 A1* | 11/2006 | Matthes | 712/220 |
| 2007/0043531 A1* | 2/2007 | Kosche et al. | 702/182 |
| 2007/0250689 A1* | 10/2007 | Aristodemou | G06F 13/28 |
| | | | 712/221 |
| 2008/0120493 A1* | 5/2008 | Yoo et al. | 712/225 |
| 2008/0126812 A1* | 5/2008 | Ahmed et al. | 713/189 |
| 2009/0172630 A1* | 7/2009 | Wang et al. | 716/18 |
| 2010/0122105 A1* | 5/2010 | Arslan et al. | 713/500 |
| 2010/0325608 A1* | 12/2010 | Radigan | 717/106 |

FOREIGN PATENT DOCUMENTS

| | | |
|---|---|---|
| KR | 1020050030014 | 3/2005 |
| KR | 10-2005-0037575 | 4/2005 |

OTHER PUBLICATIONS

Korean Office Action issued on Jan. 23, 2015 in Korean Application No. KR 10-2009-0013529 (3 pages in English, 4 pages in Korean).

* cited by examiner

APPARATUS AND METHOD FOR PROVIDING INSTRUCTION FOR HETEROGENEOUS PROCESSOR

CROSS-REFERENCE TO RELATED APPLICATION(S)

This application claims the benefit under 35 U.S.C. §119 (a) of a Korean Patent Application No. 10-2009-13529, filed Feb. 18, 2009, the disclosure of which is incorporated herein by reference in its entirety for all purposes.

BACKGROUND

1. Field

The following description relates to a data processing system, and more particularly, to an apparatus and method for processing code into a form suitable for use by a processor.

2. Description of the Related Art

A compiler can process a line of text written in a specified programming language and convert the line of text into a machine language or code that can be used by a computer. When developing a program in a language such as C or Pascal, for example, a programmer writes the lines of text one by one by using an editor. These lines of text are called source code. After writing the source code, the programmer executes a compiler that understands the language of the source code.

The output of this compiling process is called target code or a target module. The target code is machine code that can be processed or executed by a processor on an instruction-by-instruction basis.

SUMMARY

According to one aspect, a compiling apparatus includes an analysis unit configured to determine respective data widths of operands and connections in a data flow graph by using type information regarding a type of the operands, and a data processing unit configured to provide instructions, which are to be executed by a processor comprising heterogeneous components that support different data widths, based on the determined data widths of the operands and the connections.

The heterogeneous components may include at least one of a plurality of functional units to process data having different data widths, a plurality of register files to store data having different data widths, and connecting wires suitable for different data widths.

The analysis unit may initialize data widths of input and output nodes in the data flow graph based on the type information of the operands and determine data widths of unknown operands and connections using a fixed-point algorithm.

The data processing unit may select instructions based on the determined data widths of the operands and the connections in the data flow graph. The data processing unit may determine functional units which will execute the selected instructions, respectively. The data processing unit may allocate registers based on the determined data widths of the operands and the connections in the data flow graph.

If the processor is a coarse grained array (CGA) processor, the data processing unit may determine data widths of input and output operands and connections of nodes existing on the CGA processor's routing paths, which are used in executing the selected instructions, based on the determined data widths of the operands and the connections in the data flow graph.

The processor may be a very long instruction word (VLIW) processor or a CGA processor, or a combination of both.

According to another aspect, a compiling method of a compiling apparatus, includes determining, by an analysis unit of the compiling apparatus, respective data widths of operands and connections in a data flow graph by using type information of the operands, and providing, by a data processing unit of the compiling apparatus, instructions, which are to be executed by a heterogeneous processor comprising heterogeneous components that support different data widths, based on the determined data widths of the operands and the connections.

The heterogeneous components may include at least one of a plurality of functional units which process data having different data widths, a plurality of register files which store data having different data widths, and connecting wires suitable for different data widths.

The determining of the respective data widths of the operands and the connections in the data flow graph may include initializing data widths of input and output nodes in the data flow graph based on the type information of the operands, and determining data widths of unknown operands and connections using a fixed-point algorithm.

The providing of the instructions may include selecting instructions based on the determined data widths of the operands and the connections in the data flow graph.

The providing of the instructions may further include determining functional units which will respectively execute the selected instructions.

The providing of the instructions may further include allocating registers based on the determined data widths of the operands and the connections in the data flow graph.

The providing of the instructions may include, if the processor is a coarse grained array (CGA) processor, determining data widths of input and output operands and connections of nodes existing on the CGA processor's routing paths, which are used for execution of the selected instructions, based on the determined data widths of the operands and the connections in the data flow graph.

The heterogeneous processor may be a very long instruction word (VLIW) processor or a CGA processor Other features and aspects will be apparent from the following description, the drawings, and the claims.

Throughout the drawings and detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the systems, apparatuses and/or methods described herein will be suggested to those of ordinary skill in the art. Descriptions of well-known functions and constructions may be omitted for increased clarity and conciseness.

Figure 1:
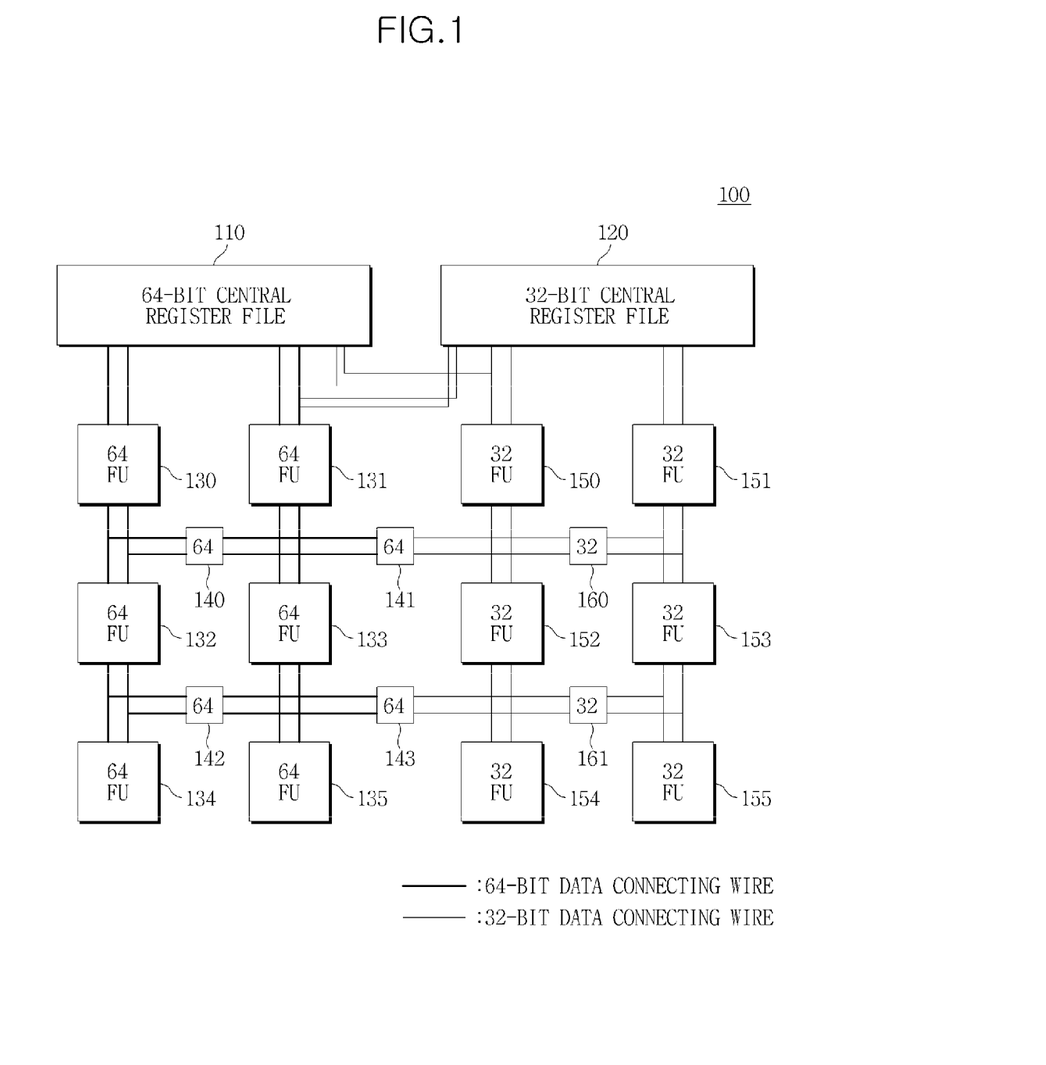
FIG. 1 is a block diagram of an exemplary heterogeneous processor.

FIG. 1 illustrates an exemplary heterogeneous processor 100.

The processor 100 may include heterogeneous components to process data having multi-width data paths. As long as the processor 100 includes heterogeneous components to process data having different data widths, it can be implemented as a very long instruction word (VLIW) processor, a coarse grained array (CGA) processor, a reduced instruction set computer (RISC), and the like. Here, the heterogeneous components may include at least one of a plurality of functional units which process data having different data widths, a plurality of register files which store data having different data widths, and connecting wires suitable for different data widths.

Referring to FIG. 1, the processor 100 includes a plurality of heterogeneous functional units 130 through 135 and 150 through 155 which can process data having different data widths, a plurality of register files 110, 120, 140 through 143, 160, and 161, and connecting wires. It is understood that depending on the specific embodiment, the processor 100 may further include other components. In FIG. 1, 64-bit data connecting wires are shown as thick solid lines, and 32-bit data connecting wires are shown as thin solid lines.

The functional units 130 through 135 and 150 through 155 carry out operations. The functional units 130 through 135 are 64-bit functional units which receive data having a data width of 64 bits, perform an operation on the data, and output the operation result. The functional units 150 through 155 are 32-bit functional units which receive data having a data width of 32 bits, perform an operation on the data, and output the operation result.

The functional units 130 through 135 and 150 through 155 may receive data from different sources and send their data processing results to different destinations. While the functional units 130 through 135 are shown in this arrangement to process data having a data width of 64 bits and the functional units 150 through 155 are shown to process data having a data width of 32 bits are shown in FIG. 1, this is only exemplary and functional units which process data having data widths other than 32 bits and 64 bits can also be implemented.

Each of the register files 110, 120, 140 through 143, 160, and 161 is a collection of registers and temporarily stores data used in the functional units 130 through 135, and 150 through 155. The register file 110 is a 64-bit central register file, and the register file 120 is a 32-bit central register file. The register files 140 through 143 are distributed 64-bit register files, and the register files 160 and 161 are distributed 32-bit register files.

Generally, components of a conventional processor, such as functional units, register files, and connecting wires, are suitable for the same data width. Thus, when processing data having data widths of 32 bits or less, while 32-bit functional units should ideally be used, a conventional processor having only 64-bit functional units may process the data using the 64-bit functional units. However, this is not desirable in terms of semiconductor size and energy efficiency for functional units capable of processing data having large data widths to process data having small data widths. By contrast, an exemplary multi-width heterogeneous processor that includes heterogeneous components (such as heterogeneous functional units, heterogeneous register files, heterogeneous data connecting wires, and heterogeneous multiplexers) as shown in FIG. 1 may consume less energy and require a smaller die region while maintaining similar performance to a conventional processor.

Figure 2:
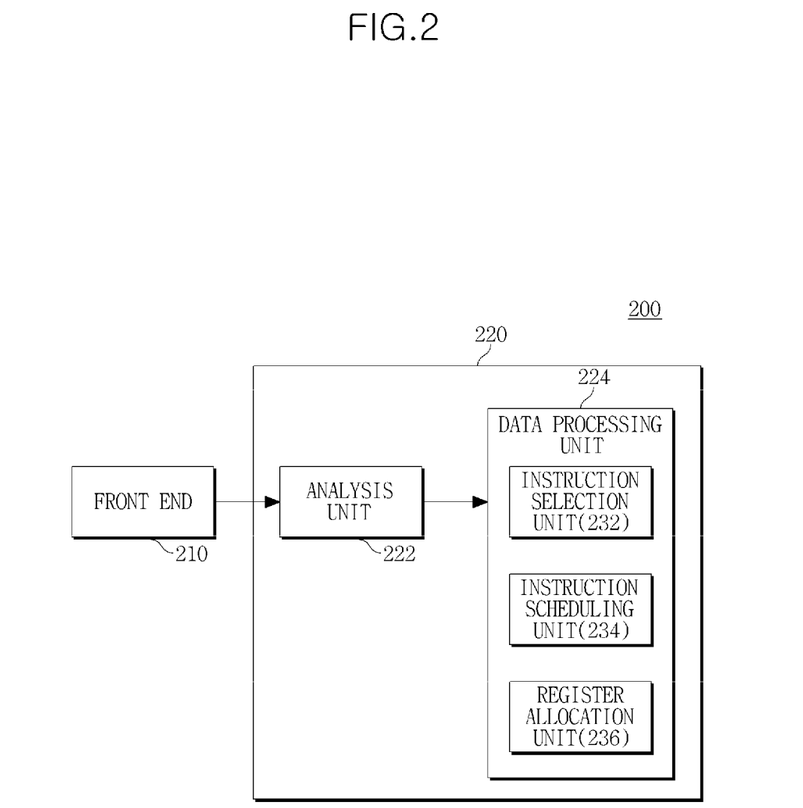
FIG. 2 is a block diagram of an exemplary apparatus for providing instructions for the heterogeneous processor of FIG. 1.

FIG. 2 illustrates an exemplary apparatus 200 for providing instructions for a heterogeneous processor, for example, the heterogeneous processor 100 of FIG. 1.

Referring to FIG. 2, the apparatus 200 is includes a front end 210 and a back end 220.

The front end 210 reads source code and converts the source code into intermediate code. The intermediate code is code suitable for optimization, into which a compiler reads and parses source code. After optimization, the intermediate code is converted into assembly code.

The back end 220 receives the intermediate code, performs various optimizations on the intermediate code, and outputs assembly code or binary machine code. The back end 220 may include an analysis unit 222 and a data processing unit 224.

The analysis unit 222 analyzes the intermediate code of the source code to implement various known or to be known optimization methods.

The analysis unit 222 generates a data flow graph showing operations, which are to be mapped onto a reconfigurable array, and data dependency between the operations. According to an aspect, inputs, operations, and outputs are represented as nodes, and data flows are represented as connections in a data flow graph.

The analysis unit 222 determines data widths of input and output operands and connections of each node by using information regarding the type of operands (also referred to as "type information") that are generated when the source code is converted into the intermediate code. The type information of an operand (for example, a variable value, a constant value, a character, and the like) denotes a value indicating the number of bits of the operand.

The analysis unit 222 initializes data widths of input and output nodes in a data flow graph based on type information of operands. Then, the analysis unit 222 repeatedly performs a fixed-point algorithm (or a fixed-point iteration) on initially set values until values resulting from the fixed-point algorithm do not change, that is, until data widths of unknown operands and connections do not change. Of available data widths, minimal bit widths are determined for unknown operands and connections whose data widths are unknown. Through the above process, data widths of all operands and connections in the data flow graph are determined.

Information about the determined data width of each operand or connection is added to each node or connection in the data flow graph. This information is later used in the process of selecting and scheduling instructions and allocating registers.

The data processing unit 224 provides instructions to be executed on the heterogeneous processor 100 by using the determined data widths of the input and output operands and the connection of each node. The data processing unit 224 selects instructions, which are to be executed by the heterogeneous processor 100, and places or maps operations to functional units. Referring to FIG. 2, the data processing unit 224 includes an instruction selection unit 232, an instruction scheduling unit 234, and a register allocation unit 236.

The instruction selection unit 232 selects instructions based on the determined data widths of the operands and the connections in the data flow graph. Instructions to be selected may be stored in advance, in the form of instruction sets, in a predetermined storage space. For example, if an input operand of a node which performs an addition operation has a data width of 30 bits and if an output operand thereof has a data width of 32 bits, a 32-bit add instruction is selected.

The instruction scheduling unit 234 determines which functional unit will execute which instruction selected. The register allocation unit 236 determines registers based on the determined data widths of the operands and the connections in the data flow graph.

If the heterogeneous processor 100 is a CGA processor, even when two nodes, which correspond to respective operations, are connected by a single connection in a data flow graph, a functional unit to which one of the two nodes is mapped and another functional unit to which the other one is mapped may be separated from each other. In this case, the instruction scheduling unit 234 determines data widths of input and output operands and connections on the CGA processor's routing paths, which are used in executing the instructions selected, based on the determined data widths of the operands and the connections in the data flow graph. That is, for data delivery, the instruction scheduling unit 234 selects nodes (for example, functional units or register files) on routing paths between nodes and determines data widths of input and output operands and connections (for example, data connecting wires) of the selected nodes.

Figure 3:
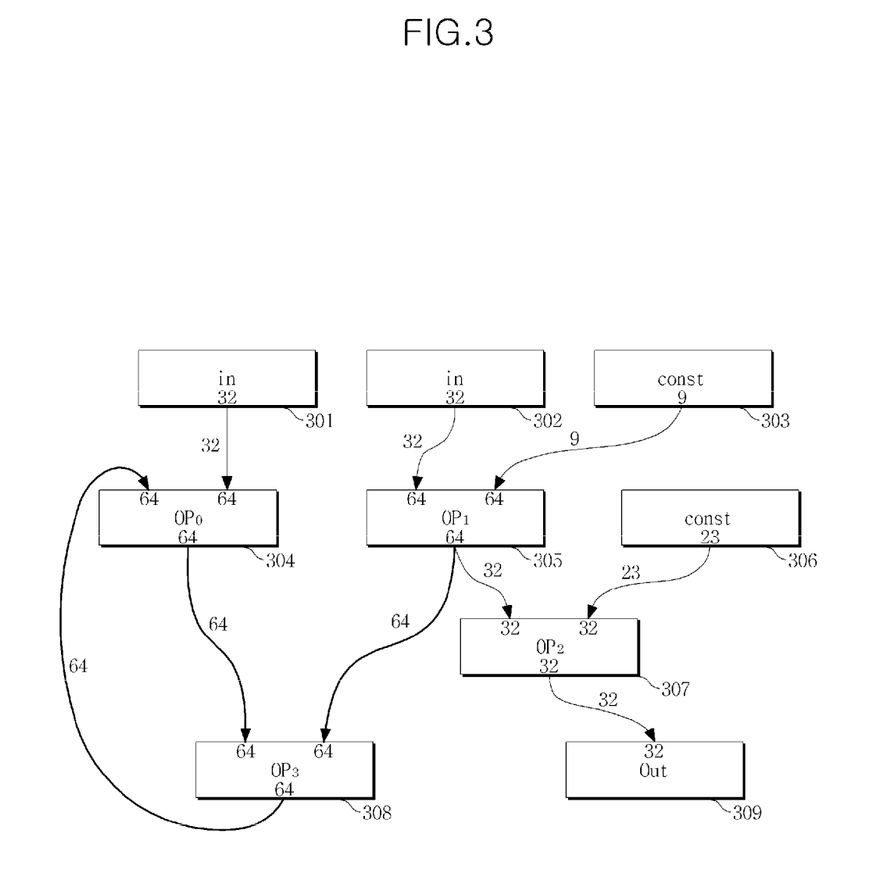
FIG. 3 is an exemplary data flow graph in which inputs, operations, and outputs may be represented as nodes, and data flows may be represented as connections.

FIG. 3 illustrates an exemplary data flow graph in which inputs, operations, and outputs may be represented as nodes, and data flows may be represented as connections. In FIG. 3, nodes 301, 302, 303, and 306 represent inputs (variable values or constant values), nodes 304, 305, 307, and 308 represent operations, and a node 309 represents an output variable value.

In each of the nodes 301 through 309, a number (or numbers) shown above characters (for example, "in" (input), "const" (input constant value), "op" (operation), and "out" (output)) indicates a data width of an operand input to the node, and a number shown under the characters indicates a data width of an operand output from the node. When pre-processed, source code gives information regarding the type of input and output nodes. That is, data widths of operands of the input nodes 301, 302, 303, and 306 and the output node 309 are determined based on the pre-processed source code.

In addition, data widths of input and output operands of the operation nodes 304, 305, 307, and 308 between the input nodes 301, 302, 303, and 306 and the output node 309 are determined using the fixed-point algorithm. Once the data widths of the input and output operands of the operation nodes 304, 305, 307, and 308 are determined, an instruction for each of the operation nodes 304, 305, 307 and 308 can be determined.

For example, since 64-bit data is input to and output from each of the operation nodes 304, 305, and 308, a 64-bit instruction is selected for each of the operation nodes 304, 305, and 308. Also, a 32-bit instruction is selected for the operation node 307 because 32-bit data is input to and output from the operation node 307.

Once instructions are selected, they are mapped to respective functional units that will execute the selected instructions. Referring to FIG. 1, instructions may be scheduled such that, for example, the operation node 305 is mapped to the functional unit 131, that the operation node 307 is mapped to the functional unit 150, and that the operation node 308 is mapped to the functional unit 130.

Figure 4:
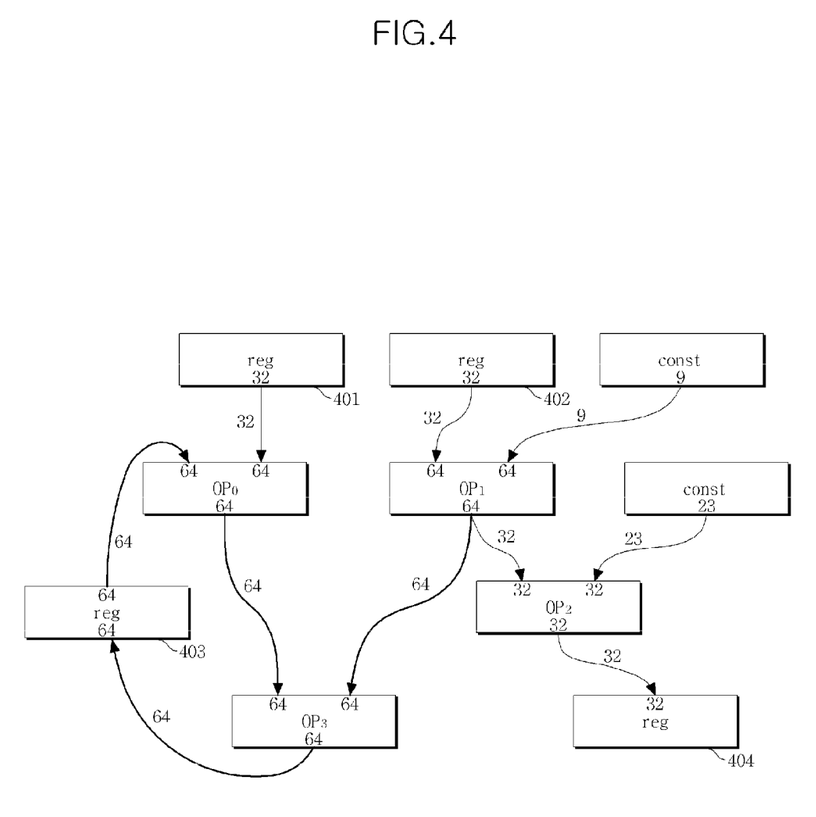
FIG. 4 is a modified version of the exemplary data flow graph of FIG. 3 which takes registers into consideration.

FIG. 4 illustrates a modified version of the exemplary data flow graph of FIG. 3, which takes registers into consideration.

The exemplary data flow graph of FIG. 4 is created as a result of modifying the exemplary data flow graph of FIG. 3 to represent registers. In the data flow graph of FIG. 4, a node 401 corresponds to a register which stores the input node 301, a node 402 corresponds to a register which stores the input node 302, and a node 404 corresponds to a register which stores the output node 309. In addition, a node 403 corresponds to a register which is required to store data between the operation node 308 and the operation node 304.

That is, if the data flow graph of FIG. 3 is modified into the data flow graph of FIG. 4, a 32-bit register is used for each of the nodes 401, 402, and 404, and a 64-bit register is used for the node 403.

Figure 5:
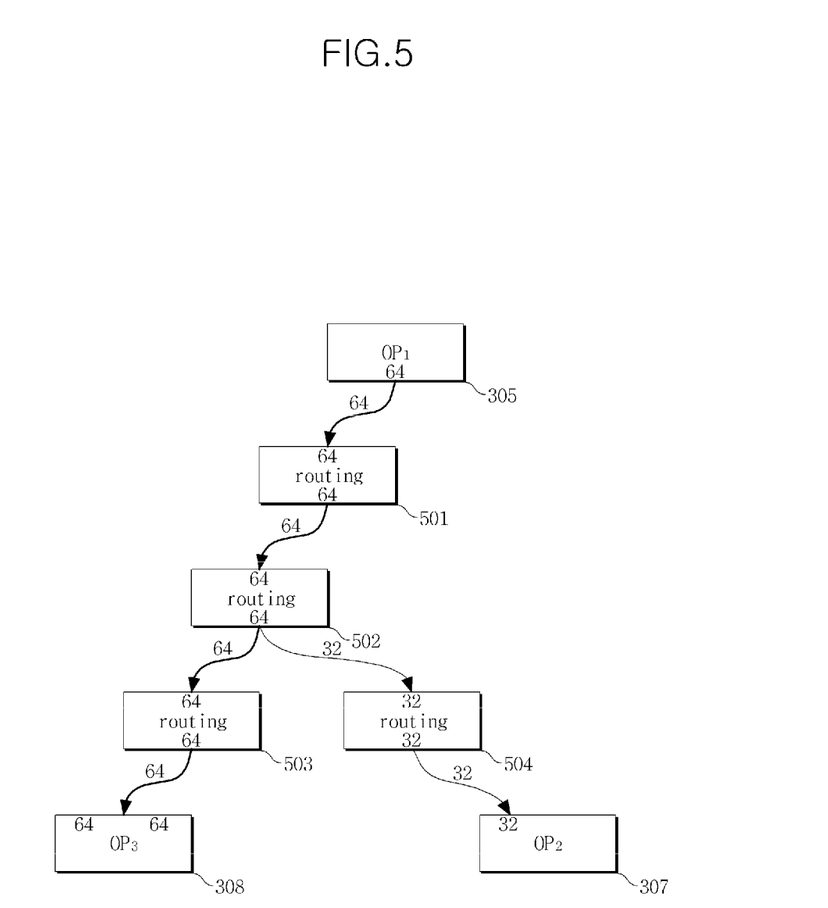
FIG. 5 is an exemplary data flow graph which takes routing into consideration.

FIG. 5 illustrates an exemplary data flow graph which takes routing into consideration.

Generally, a CGA processor performs a repetitive operation (such as loop operations, for example) which causes large data throughput according to control of a core such as VLIW. The CGA processor typically includes a plurality of functional units. In addition, the CGA processor makes the most of instruction-level parallelism between operations existing in an application to enhance its performance. That is, the CGA processor distributes operations, which may be carried out simultaneously, to a plurality of the functional units therein in order to perform the operations at the same time, thereby reducing the time required to execute an application. Since the functional units in the CGA processor are sparsely connected, operand routing between operations as well as operation placement should be taken into consideration when scheduling instructions.

Thus, referring to FIG. 2, the instruction scheduling unit 234 determines data widths of input and output operands and connections on the CGA processor's routing paths, for example, which are used for execution of instructions selected, based on the determined data widths of operands and connections in a data flow graph. That is, for data delivery, the instruction scheduling unit 234 selects nodes (for example, functional units or register files) on a routing path between nodes and determines data widths of input and output operands and connections (for example, data connecting wires) of the selected nodes.

The nodes 301 through 309 in the exemplary data flow graph of FIG. 3 may be executed by a CGA processor. In this case, if functional units, which respectively execute the operation node 305 and the operation node 308, are separated from each other in the CGA processor, a routing path is created to deliver the result of executing the operation node 305 to the operation node 308. Here, nodes 501 through 503 correspond to functional units or register files on the routing path for delivering the result of executing the operation node 305 to the operation node 308.

In addition, if functional units, which respectively execute the operation node 305 and the operation node 307, are separated from each other in the CGA processor, a routing path should also be created to deliver the result of executing the operation node 305 to the operation node 307. In this case, the nodes 501 and 502 and a node 504 correspond to functional units or register files on the routing path for delivering the result of executing the operation node 305 to the operation node 307.

Figure 6:
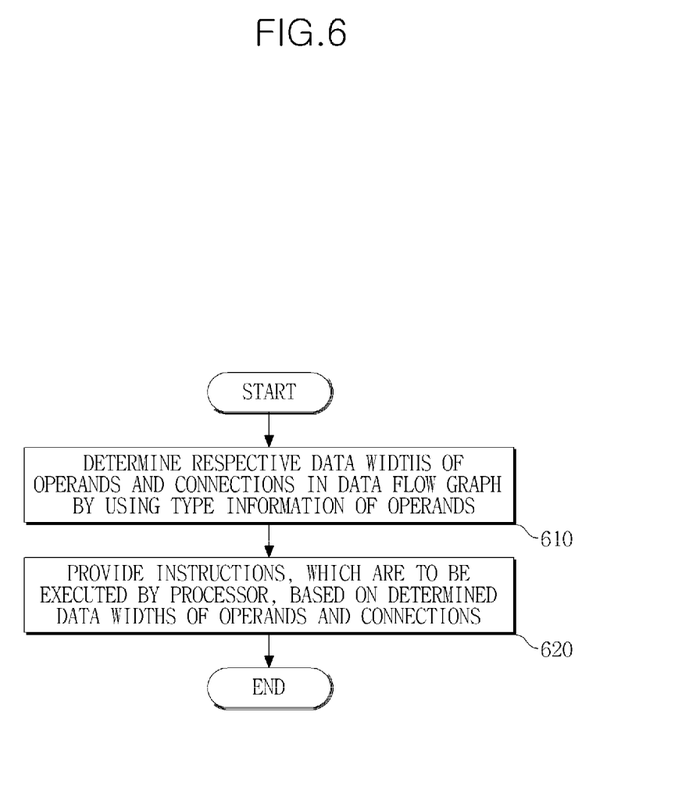
FIG. 6 is a flowchart illustrating an exemplary method of providing instructions for the heterogeneous processor of FIG. 1.

FIG. 6 is a flowchart illustrating an exemplary method of providing instructions for a heterogeneous processor, for example, the heterogeneous processor 100 of FIG. 1.

In operation 610, respective data widths of operands and connections in a data flow graph are determined based on type information of the operands. Data widths of input and output nodes in the data flow graph may be initialized based on the type information of the operands, and respective data widths of unknown operands and connections may be determined using fixed point algorithm.

In operation 620, instructions to be executed by a heterogeneous processor, which includes heterogeneous components supporting different data widths, are provided to the heterogeneous processor based on the determined data widths of the operands and the connections. As described above, the heterogeneous components may include at least one of a plurality of functional units which process data having different data widths, a plurality of register files, and connecting wires suitable for different data widths.

Instructions may be selected based on the determined data widths of the operands and the connections in the data flow graph, and functional units, which can respectively process the selected instructions, may be determined. In addition, registers may be allocated based on the determined data widths of the operands and the connections in the data flow graph.

If the heterogeneous processor is a CGA processor, data widths of input and output operands and connections of nodes on the CGA processor's routing paths, which are used for execution of instructions selected, may be determined based on the determined data widths of the operands and the connections in the data flow graph.

According to example(s) described above, source code may be more efficiently compiled in consideration of data widths, so that they can be used in a processor capable of performing heterogeneous operations while requiring a smaller chip region and consuming less power.

The subject matter disclosed herein including the methods described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. Examples of computer-readable media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

Also, codes and code segments for accomplishing the disclosed subject matter can be construed by programmers skilled in the art to which the present subject matter pertains.

A number of exemplary embodiments are described above. Nevertheless, it will be understood that various modification may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A compiling apparatus comprising:
   an analysis unit configured to generate a data flow graph comprising nodes representing inputs, operations, and outputs, and connections representing data flows between the nodes, to determine data widths of input and output operands of the nodes and the connections in the data flow graph using type information regarding a type of the operands, and to add information about the determined data width of the input and output operands of the nodes and information about the connections between the nodes in the data flow graph; and
   a data processing unit configured to provide instructions to be executed by a processor comprising heterogeneous components that support different data widths, based on the determined data widths of the operands and the connections in the data flow graph,
   wherein the type information comprises a value indicating a number of bits, and the data processing unit is further configured to select, in response to respective determinations of the determined data widths of the operands and the connections in the data flow graph, instructions comprising a data width matching the determined data widths of the operands and the connections in the data flow graph, and
   wherein the analysis unit is further configured to initialize data widths of input and output nodes in the data flow graph based on the type information of the operands and to determine and set, using a fixed-point algorithm, data widths of unknown operands and connections as minimal data widths thereof from among available data widths.

2. The compiling apparatus of claim 1, wherein the heterogeneous components comprise at least one functional unit that processes data having a respective data width, register files that store data having different data widths, and connecting wires suitable for different data widths.

3. The compiling apparatus of claim 1, wherein the data processing unit is further configured to determine functional units to execute the selected instructions.

4. The compiling apparatus of claim 1, wherein the data processing unit is further configured to allocate registers based on the determined data widths of the operands and the connections in the data flow graph.

5. The compiling apparatus of claim 1, wherein if the processor is a coarse grained array (CGA) processor, the data processing unit is further configured to determine data widths of input and output operands and connections of nodes existing on the CGA processor's routing paths, which are used for execution of the selected instructions, based on the determined data widths of the operands and the connections in the data flow graph.

6. The compiling apparatus of claim 5, wherein the processor is a very long instruction word (VLIW) processor or a CGA processor.

7. A compiling method of a compiling apparatus, the compiling method comprising:
generating, by an analysis unit, a data flow graph comprising nodes representing inputs, operations, and outputs, and connections representing data flows between the nodes;
determining data widths of input and output operands of the nodes and the connections in the data flow graph using type information of the operands;
adding information about the determined data width of the input and output operands of the nodes and information about the connections between the nodes in the data flow graph; and
providing, by a data processing unit of the compiling apparatus, instructions to be executed by a heterogeneous processor comprising heterogeneous components that support different data widths, based on the determined data widths of the operands and the connections in the data flow graph,
wherein the type information comprises a value indicating a number of bits, and the providing of the instructions further comprises selecting, in response to respective determinations of the determined data widths of the operands and the connections in the data flow graph, instructions comprising a data width matching the determined data widths of the operands and the connections in the data flow graph, and
wherein the determining of the respective data widths of the operands and the connections in the data flow graph comprises:
initializing data widths of input and output nodes in the data flow graph based on the type information of the operands; and
determining and setting, using a fixed point algorithm, data widths of unknown operands and connections as minimal data widths thereof from among available data widths.

8. The compiling method of claim 7, wherein the heterogeneous components comprise at least one functional unit that processes data having a respective data width, register files that store data having different data widths, and connecting wires suitable for different data widths.

9. The compiling method of claim 7, wherein the providing of the instructions further comprises determining functional units to execute the selected instructions.

10. The compiling method of claim 7, wherein the providing of the instructions further comprises allocating registers based on the determined data widths of the operands and the connections in the data flow graph.

11. The compiling method of claim 7, wherein the providing of the instructions comprises, if the processor is a coarse grained array (CGA) processor, determining data widths of input and output operands and connections of nodes existing on the CGA processor's routing paths, which are used for execution of the selected instructions, based on the determined data widths of the operands and the connections in the data flow graph.

12. The compiling method of claim 7, wherein the heterogeneous processor is a very long instruction word (VLIW) processor or a CGA processor.

13. A compiling apparatus comprising:
a processor configured to
generate a data flow graph comprising nodes representing inputs, operations, and outputs, and connections representing data flows between the nodes,
determine data widths of input and output operands of the nodes and the connections in the data flow graph using type information regarding a type of the operands, and
add, to the data flow graph, information about the determined data widths of the input and output operands of the nodes and information about the connections between the nodes in the data flow graph; and
provide instructions, to be executed by a processor comprising heterogeneous components that support different data widths, based on the determined data widths of the operands and the connections in the data flow graph,
select, in response to the determining of the data widths of the operands and the connections in the data flow graph, instructions comprising an operand data width corresponding to the determined data widths of the operands and the connections in the data flow graph, and
use initial data widths of operands and connections, determined using the type information, to determine unknown minimal data widths of operands and connections through an iterative process that repeats until the determined unknown data widths of operands and connections do not change.

14. The apparatus of claim 13, further comprising a memory configured to store instructions,
wherein the processor is further configured to execute the instructions to configure the processor to:
generate a data flow graph comprising nodes representing inputs, operations, and outputs, and connections representing data flows between the nodes, to
determine data widths of input and output operands of the nodes and the connections in the data flow graph using type information regarding a type of the operands, and to
add, to the data flow graph, information about the determined data widths of the input and output operands of the nodes and information about the connections between the nodes in the data flow graph; and
a data processing unit configured to provide instructions, to be executed by a processor comprising heterogeneous components that support different data widths, based on the determined data widths of the operands and the connections in the data flow graph,
wherein the data processing unit is further configured to select, in response to respective determinations of the determined the determining of the data widths of the operands and the connections in the data flow graph, instructions comprising an operand data width corresponding to the determined data widths of the operands and the connections in the data flow graph, and
use initial data widths of operands and connections, determined using the type information, to determine unknown minimal data widths of operands and connections through an iterative process that repeats until the determined unknown data widths of operands and connections do not change.

15. The apparatus of claim 13 wherein the processor comprises a data processing unit configured to determine a routing path for delivering a result of a first operation node to a second operation node, the routing path comprising register nodes having a data width greater than or equal to a data width of the result of the first operation node to be delivered to the second operation node.

16. The apparatus of claim 13 wherein the heterogeneous components comprise:

a 32-bit functional unit which receives data having a data width up to 32 bits; and a 64-bit functional unit which receives data having a data width up to 64 bits.

17. The apparatus of claim 13 wherein a result of an upstream node of the data flow graph is delivered as an input to a downstream node of the data flow graph, and a result of the downstream node is delivered as an input to the upstream node.

18. The apparatus of claim 13 wherein a result of a first operation node of the data flow graph is delivered to a second operation node of the data flow graph, and the second operation node comprises a data width different from a data width of the first operation node.

* * * * *